United States Patent [19]

Iwasaki

[11] Patent Number: 4,618,804

[45] Date of Patent: Oct. 21, 1986

[54] REMOTE CONTROL APPARATUS FOR OPENING AND SHUTTING A BLIND

[75] Inventor: Masashi Iwasaki, Osaka, Japan

[73] Assignee: Kanematsu-Gosho, Ltd., Kobe, Japan

[21] Appl. No.: 745,275

[22] Filed: Jun. 14, 1985

[30] Foreign Application Priority Data

Jun. 28, 1984 [JP] Japan ............................ 59-134722

[51] Int. Cl.[4] .............................................. H04Q 9/14

[52] U.S. Cl. ...................................... 318/16; 318/480

[58] Field of Search ................. 318/16, 480, 256, 280, 318/434; 49/25; 160/5; 250/338.1

[56] References Cited

U.S. PATENT DOCUMENTS

| | | | |
|---|---|---|---|
| 3,946,291 | 3/1976 | Marheine | 318/16 X |
| 4,371,814 | 2/1983 | Hannas | 318/16 |
| 4,385,296 | 5/1983 | Tsubaki et al. | 318/16 X |
| 4,400,698 | 8/1983 | Wessels et al. | 318/16 X |
| 4,467,249 | 8/1984 | Swearingen, Jr. | 318/16 X |

*Primary Examiner*—William M. Shoop, Jr.
*Assistant Examiner*—Bentsu Ro
*Attorney, Agent, or Firm*—Trexler, Bushnell & Wolters, Ltd.

[57] ABSTRACT

A remote control system for bidirectionally rotating an electric motor, such as for opening and closing a blind or the like, comprises a hand-held transmitter including a transmitting circuit capable of developing a forward rotation command signal and a reverse rotation command signal, and a transmitter responsive to each of the command signals for producing a corresponding, predetermined number of infrared pulses for a predetermined amount of time. A receiver and drive unit is operatively coupled with the motor and comprises a receiver responsive to the infrared pulses for developing a corresponding received command signal, a discriminator circuit for determining whether the received command signal corresponds to the command signal for normal rotation or reverse rotation and for producing a corresponding forward rotation or reverse rotation control signal, and a drive circuit responsive to the control signal for causing rotation of the electric motor in the corresponding direction.

6 Claims, 5 Drawing Figures

REMOTE CONTROL APPARATUS FOR OPENING AND SHUTTING A BLIND

BACKGROUND OF THE INVENTION

This invention relates generally to apparatus utilizing infrared rays to remotely control operation of a member or machine, and more particularly to such a device for controlling bidirectional rotation of a motor, for example, for opening and shutting of a blind installed on a window.

A conventional window blind generally comprises a plurality of louver boards or slats mounted in a parallel and spaced apart condition. These boards or slats are generally rotatable in unison between positions where the flat surfaces are spaced and parallel to define a plurality of openings to permit light to pass therethrough, and a position in which respective edges of the flat surfaces are abutting to present a generally closed surface for preventing the passage of light therethrough. Generally speaking, this rotation of the slats or louver boards is accomplished by a rotatable shaft or other rotatable member operatively coupled with all of the slats, and a further manually accessible cord or cords, a flexible shaft or other manual operating member in turn coupled with the rotatable shaft or other rotatable member. Alternatively, a small electric motor may be mounted to rotate the shaft or other rotatable member for adjusting the angular or rotational orientation of the slats or louver boards.

In order to adjust the angle or opening of the louver boards or slats, the user must approach the window and manually adjust the cord or flexible shaft member to obtain the desired opening or angular orientation. When an electric motor is utilized, the motor must be connected by suitable electrical wiring to a control switch to be manually operated by the user. This control switch may then be mounted at or near the window or at some desired remote location. However, in many instances, such as in offices or other buildings, it may be desired for a number of workers or other users to be able to operate the blind from different locations. In order to operate the blind by means of the above-described motor arrangement, it is necessary to provide increasingly complex switch and motor wiring so as to provide control switches at each of a plurality of locations. As this switch and motor wiring increases in complexity, the manufacturing and installation costs also increase. Moreover, the number and locations of the various users must be determined before installation of such a system and it is inconvenient and difficult to change or modify the wiring and switch locations, once installed.

OBJECTS AND SUMMARY OF THE INVENTION

Accordingly, it is a general object of the invention to provide a remote control system for controlling operation of an electric motor from a plurality of locations, which avoids the foregoing problems.

A more specific object is to provide a control system for opening and shutting a motor-driven blind which requires no wiring between the motor and the user and which is reliably and accurately remotely controllable so as to open and shut the louvers of the blind at any time from locations remote from the blind itself.

Briefly, and in accordance with the foregoing objects, a remote control system for bidirectionally rotating an electric motor, such as for opening and closing a blind or the like, in accordance with the invention comprises a hand-held transmitter including transmitting circuit means capable of developing a forward rotation command signal and a reverse rotation command signal, transmitting means responsive to each of said command signals for producing a corresponding, predetermined number of infrared pulses for a predetermined amount of time; and a receiver and drive unit operatively coupled with said motor and comprising receiving means responsive to said infrared pulses for developing a corresponding received command signal, a discriminator circuit for determining whether said received command signal corresponds to the command signal for normal rotation or reverse rotation and producing a corresponding forward rotation or reverse rotation control signal, and drive circuit means responsive to said control signal for causing rotation of said electric motor in the corresponding direction.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figure 1:
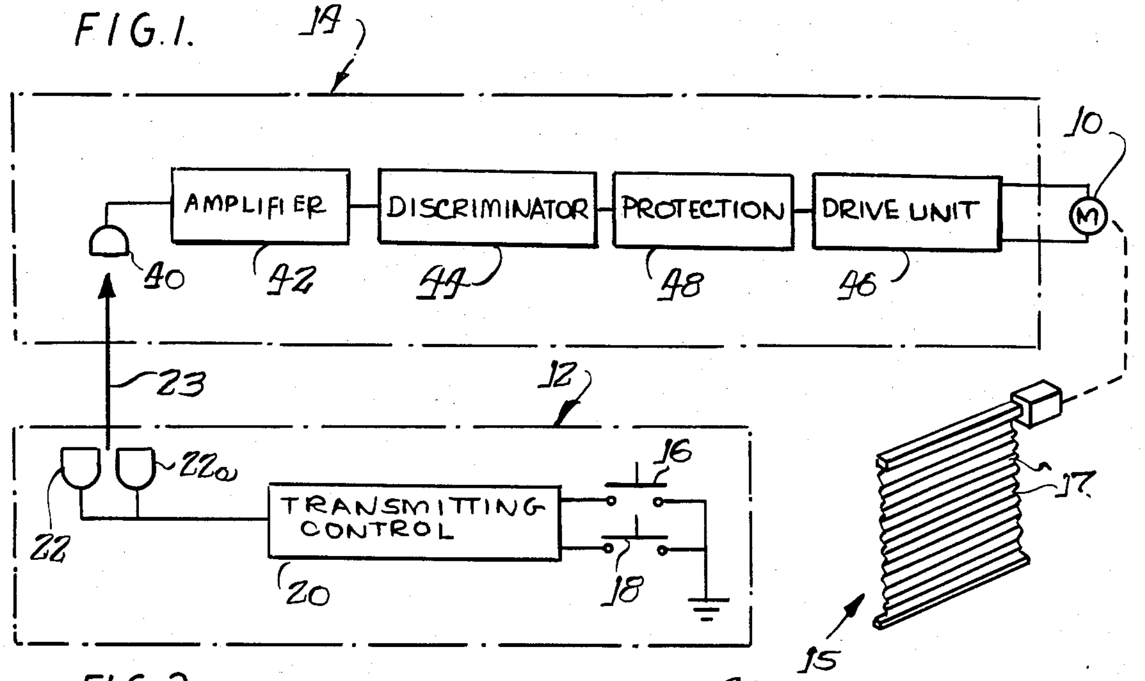
FIG. 1 is a block diagram of a preferred embodiment of a remote control system in accordance with the invention.

Referring now to the drawings and initially to FIG. 1, a remote control system in accordance with the invention for controlling bidirectional rotation of an electric motor is illustrated in block diagrammatic form. This system includes a hand-held transmitter 12 which is portable, so as to remotely control operation of the motor 10 from any of a plurality of locations remote therefrom, without requiring any connecting wires or the like. In the illustrated embodiment, the system is an infrared system, and the transmitter operates to transmit an infrared signal comprising a command signal for controlling rotation of the motor 10. In this regard, the motor 10 may be operatively coupled for rotating the louvers or slats of a window blind 15, or for operating any other apparatus, as desired, without departing from the invention. An infrared responsive receiver and drive unit 14 is operatively coupled with the motor 10 and is preferably located adjacent the motor 10 and near the window blind or other apparatus to be operated thereby.

Referring initially to the hand-held transmitter 12, it will be seen to comprise a manually operated control or selector means, such as a pair of pushbuttons or other switches or similar control members 16, 18 which may be selectively pressed or otherwise actuated by an operator to call for either normal (forward) or reverse rotation of the motor 10. A transmitting circuit portion 20 is responsive to the actuated one of the controls 16 and 18 for developing a corresponding normal rotation command signal or a corresponding reverse rotation command signal. An infrared transmitting means, which in the illustrated embodiment comprises a pair of infrared light emitting diodes (LED's) 22, 22*a* is responsive to each of the command signals from the circuit 20 for emitting a predetermined and corresponding number of infrared pulses for a predetermined amount of time. That is, some preselected number of pulses are emitted in response to the normal or forward rotation command signal and some different number of pulses are emitted in response to the command signal for reverse rotation.

Figure 3:
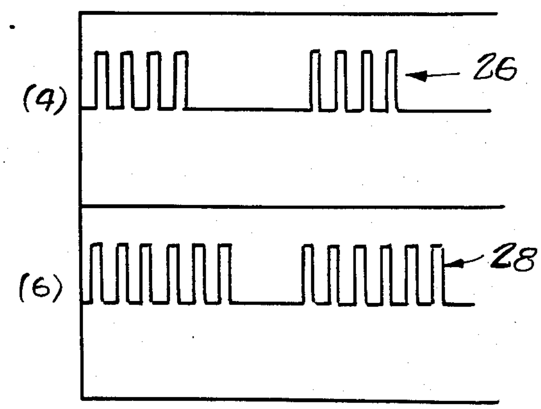
FIGS. 3 and 4 are graphic illustrations of waveforms of a command signal and corresponding infrared pulses developed by the transmitter of FIG. 2.
Figure 4:
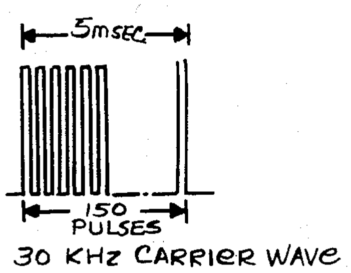

Referring to FIGS. 3 and 4, in the illustrated embodiment, the command signals developed by the transmitting circuit 20 comprise first and second series of pulses designated generally by reference numerals 26 and 28 comprising respectively the normal and reverse rotation command signals. The normal or forward rotation command signal 26 in the illustrated embodiment comprises a repeating series of four pulse signals, preferably transmitted on a 30 KHz carrier wave as shown in FIG. 4. A longer interval is then provided intermediate a first set of these four pulse signals and a following set of four pulse signals. This "four pulse", normal rotation command signal is then repeated for some predetermined time interval. Similarly, the reverse rotation command signal 28 comprises a second predetermined number of pulses, which in the illustrated embodiment is six pulses, also on a 30 KHz carrier wave. Like the forward or normal rotation command signal 26, this latter signal 28 is repeated at spaced intervals of time for a predetermined amount or interval of time. The pulses of infrared rays, indicated at reference numeral 23, emitted by the transmitting means or LED's 22, 22*a* correspond substantially in number, duration and repetition to the pulse signals 26 and 28.

Preferably, the respective command signals 26 and 28 are repeated for as long as the corresponding control pushbutton 16 or 18 is held depressed by the user. This results in a corresponding desired degree of rotation of the motor and corresponding action of the object or thing controlled thereby, that is, rotation is continued for the same length of time for which the user holds the desired control button depressed. Hence, the user may visually observe the position of the slats of the blind 15 for example, and release the control button 16 or 18 when the slats reach the desired position.

Referring now to the receiver and drive unit 14, a receiving means, preferably comprising an infrared photoresponsive diode (photodiode) 40 is provided for responding to the infrared pulses 23 emitted by the transmitting means or LED's 22, 22*a* for developing a corresponding received command signal. That is, the photodiode 40 develops a received command signal which is substantially identical in form with the pulses transmitted by the LED's 22, 22*a*. Hence, the received command signal for forward rotation is substantially identical to the signal 26 of FIG. 3, while the received command signal for reverse rotation is substantially identical to the signal 28 of FIG. 3. In the illustrated embodiment, an amplifier circuit 42 is provided for further amplifying the received command signal, prior to further processing by the receiver and drive circuit 14. A discriminator circuit 44 is responsive to the received command signal, preferably as amplified by amplifier circuit 42, for determining whether the received command signal corresponds to the command signal for normal rotation or reverse rotation. The discriminator circuit 44 responsively produces a corresponding forward or reverse rotation control signal to be fed to a drive circuit or drive unit 46 which is coupled with the motor 10.

In the illustrated embodiment, a protection circuit 48 is interposed between the discriminator circuit and the drive unit for purposes which will be described presently. The drive unit 46 is responsive to the control signals produced by the discriminator circuit for energizing the motor 10 so as to rotate in the corresponding normal or reverse direction, for example for opening or closing the slats 17 of the of window blind 15.

The protection circuit 48 is preferably interposed between the discriminator circuit 44 and drive circuit or unit 46 to prevent a rotation command signal from continuing to rotate the motor 10, after the blind or other controlled member reaches a given limit of rotation or other movement. Such continued rotation of the motor when the slats of the blind, for example, have been fully closed in either direction would result in stalling of the motor. Such stalling of the motor causes current surges, which if allowed to occur with sufficient frequency and over sufficient periods of time can cause damage to the motor 10.

Accordingly, the protection circuit 48 is also coupled with the motor 10 as indicated in dotted line in FIG. 1, to detect a current surge which would occur upon stalling of the motor. This protection circuit 48 is responsive to such a current surge at the motor 10 for in effect reversing the direction of rotation of the motor 10. That is, if the motor is rotating the normal or forward direction and stalls, the protection circuit will cause the motor to begin to rotate in the reverse direction, if the normal command signal continues to be transmitted. On the other hand, if the motor is rotating in the reverse direction and begins to stall, the protection circuit will cause the motor to begin to rotate in the opposite or normal direction if the reverse direction command signal continues to be transmitted. In operation, the protection circuit 48 in effect selects the opposite control signal from the discriminator circuit when motor stalling and the resultant current surge is detected. This circuit's operation will be more fully explained hereinbelow with reference to FIG. 5.

Figure 2:
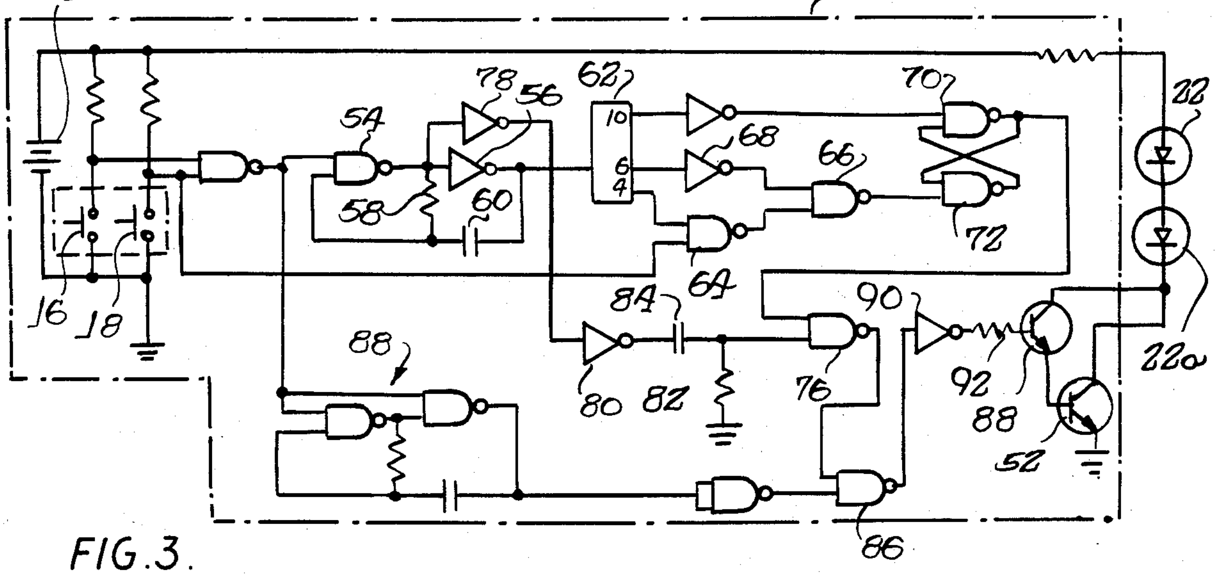
FIG. 2 is a schematic circuit diagram of a transmitter portion of the embodiment of FIG. 1.

Referring now also to FIG. 2, the circuit configuration of the transmitter 12 is illustrated in additional detail. The transmitter is preferably battery powered, as by a battery 50 which is coupled across the LED's 22 and 22*a*. However, a switching transistor 52 is coupled in series with LED's 22 and 22*a* and must be actuated to complete the circuit with battery 50 to energize LED's 22 and 22*a*. The remaining portion of the circuit is responsive to depression of one of the pushbuttons 16 and 18 for controlling the switching of the transistor 52 in the proper fashion to cause the LED's to emit pulses in accordance with one of the waveforms 26 and 28 for respective normal and reverse rotation.

In this regard, switches 16 and 18 are coupled for energizing or activating an oscillator circuit comprising NAND gate 54, inverter 56, resistor 58 and capacitor 60. This oscillator circuit is free running at substantially 30 kilohertz and provides a continuous train of rectangular pulses to the count input of a counter integrated circuit 62. This counter circuit 62 has outputs from one through ten. The "4" output of the counter will become energized when four pulses from the oscillator are counted. This "4" output feeds one input of a two-input NAND gate 64. Similarly, the "6" output of the counter 62 feeds one input of a further two-input NAND gate 66 by way of a series-coupled inverter 68. The second input of gate 66 is fed from the output of gate 64.

The output of gate 66 feeds one input of a flip-flop circuit comprising further NAND gates 70 and 72. The other input of this flip-flop circuit is fed from the "10" output of the counter 62. Accordingly one of the fourth and sixth pulses counted by the counter 62 will momentarily blank the output of the flip-flop circuit to thereby cause the gap between groups of four and six pulses respectively of the waveforms 26 and 28.

In this regard, the control switch 18 for reverse rotation is coupled directly with the remaining input of gate 64 for also energizing or enabling this gate when depressed, and therefore selecting the "6" output of the counter 62 rather than the "4" output to result in the flip-flop circuit changing state upon each sixth pulse counted by counter 62. Conversely when the normal rotation push-button 16 is depressed, the flip-flop changes state with each fourth count from the counter 62. The flip-flop circuit feeds one input of a further control gate 76 whose remaining input is fed from the oscillator circuit by way of intervening series-coupled inverters 78, 80 and a pulse-forming RC network comprising resistor 82 and capacitor 84 for sharpening the rectangular form of the pulses produced by the oscillator circuit.

The gate 76 feeds a first input of a further two-input NAND gate 86 whose remaining input is fed from a pushbutton switch closure verification circuit designated generally by reference numeral 88 which is coupled in circuit with the switches 16 and 18 for enabling the gate 86 only when one of these switches is depressed. Hence, the output of gate 86 corresponds substantially to the respective pulses or waveforms 26 and 28 when the corresponding one of switches 16 and 18 is depressed. This waveform is fed to transistor 52 by way of a further similar transistor 88 which is coupled with gate 86 by an inverter-type buffer 90 and current limiting resistor 92.

Accordingly, the transistor 52 will respond to the received pulse signals for correspondingly pulsing current from battery 50 on and off with respect to LED's 22 and 22*a*. Responsively, these LED's will emit pulses of infrared energy in a pattern corresponding to the switching of transistor 52 and hence to the selected normal or reverse rotation signal. That is, the infrared energy emitted will be in pulses corresponding substantially to one of the waveforms 26 or 28 in accordance with the selected command signal.

Figure 5:
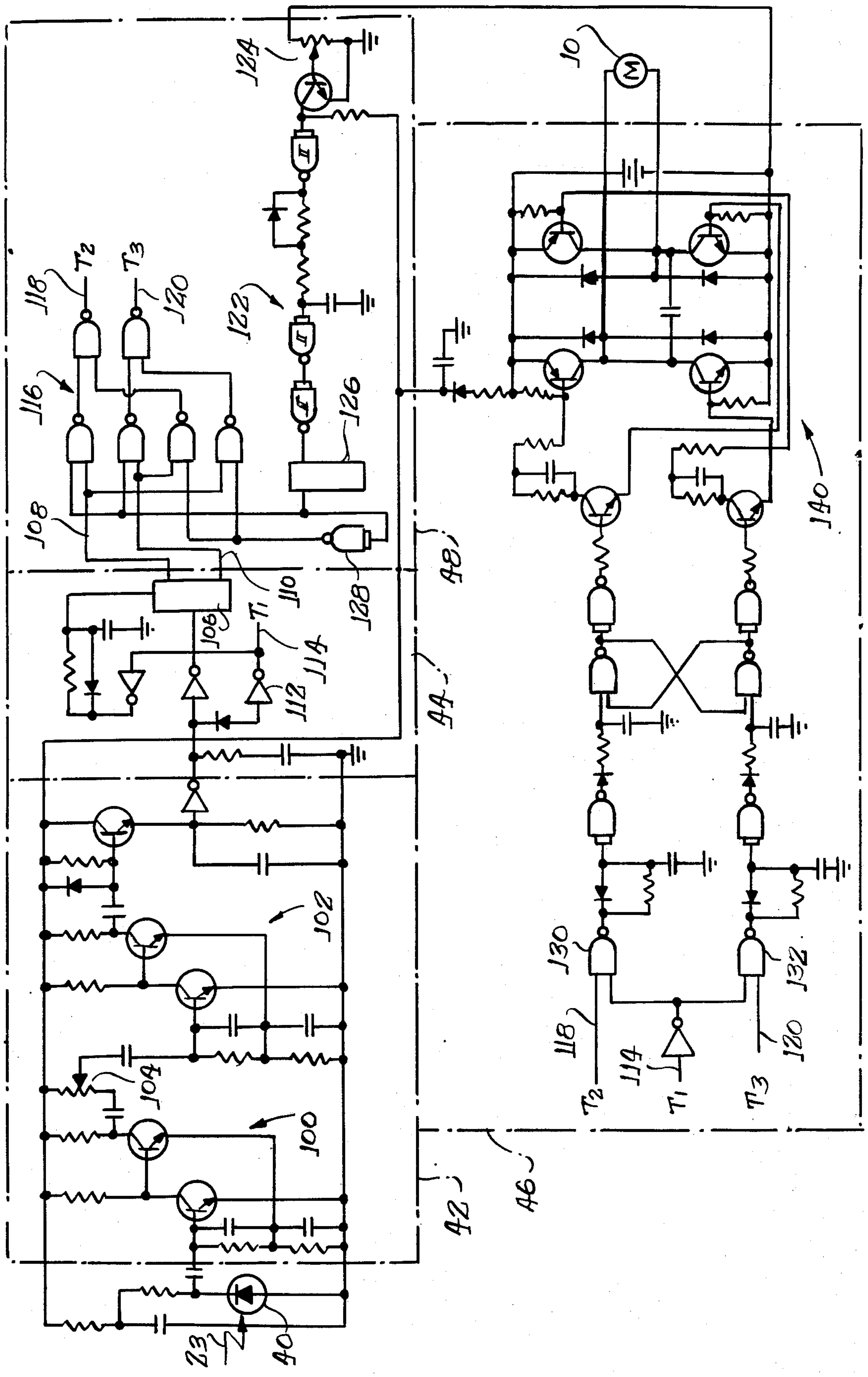
FIG. 5 is a schematic circuit diagram of a receiver and drive unit portion of the embodiment of FIG. 1.

Reference is next invited to FIG. 5, wherein details of the circuit construction of the receiver and drive unit 14 are illustrated. The photodiode 40 responds to the infrared pulses transmitted by LED's 22, 22*a* by producing a corresponding received command signal. That is, the photodiode produces a signal of the form indicated at either 26 or 28 in FIG. 3. The infrared responsive photodiode 40 feeds the received command signal to the amplifier circuit 42 which comprises a two stage amplifier circuit. A first amplification stage 100 is arranged in the preferred embodiment for amplifying the output of the photodiode 40 by a factor of substantially 1000. In the illustrated embodiment, the second amplification stage 102 is arranged for amplifying the output of first stage 100 also by a factor of substantially 1000. Additionally, a variable resistor 104 is provided intermediate amplification stages 100 and 102 for providing further adjustment of the net amplification factor provided as desired. In this regard, the variable resistor 104 may be varied to select the resultant output level of the amplifier 42 corresponding to amplification of the output of the photodiode 40 by a factor of anywhere from one to one million.

The discriminator circuit 44 utilizes a counter integrated circuit 106 to count the pulses of the received command signal, which corresponds to the number of the command signal or infrared pulses transmitted from the transmitter 12 as described above. That is, pulses on a 30 kilohertz carrier wave in groups of either four or six pulses are received at the input of counter 106. This counter produces a normal rotation control signal by activating a first output 108 if the normal rotation command signal or groups of four pulses are received. The counter produces a reverse rotation control signal by activating a second output 110 if the command signal for reverse rotation or groups of six pulses are received. The amplified received command signal (T1) is also provided by way of an inverter buffer 112 at a first control signal output terminal 114. This control signal (T1) is an input signal to the drive circuit 46 as indicated by like reference numeral 114 at one input thereof.

The normal and reverse rotation control signals produced by the circuit 44 on lines 108 and 110 feed a gating or switching array designated generally by reference numeral 116. The array 116 in turn provides corresponding gated control signal outputs 118 (T2) and 120 (T3) which feed like referenced inputs of the motor drive circuit 46. This gating or switching circuit 116 forms a part of the protection circuit 48, which also includes a current surge detector circuit portion 122 which is coupled with the motor drive circuit through a current adjusting variable resistor 124 for responding to the current in the motor drive circuit.

A current surge in the motor drive circuit will activate the circuit 122, causing a control pulse to be produced and applied to an input of a circuit element 126 which forms a portion of circuit 122. This element 126 has its output coupled to selected inputs of selected gates of the gating circuit 116 and the inverse of this output is also provided by a gate 128 wired as an inverter to feed other selected inputs of selected gates of circuit 116. When a current surge is detected in the motor drive circuit, the circuit 122 activates the circuit element 126 so as to reverse the control signals fed to gates 116 and thereby reverse the two control signals produced at outputs 118 and 120. That is, the signal at output 108 is normally reproduced at output 118 and the signal at output 110 is normally reproduced at output 120. However, when circuit 122 is activated in response to a current surge in the motor drive circuit, the gating or switching circuit 116 will now effectively couple output 108 with output 120 and output 110 with output 118, thus in effect reversing the normal and reverse rotation control signals at their inputs to the motor drive circuit 46.

In this regard, the motor drive circuit 46 receives the control outputs 114, 118 and 120 at a pair of two-input gates 130 and 132. The control output 114 will be remembered to be a train of pulses corresponding generally to one of the wave forms 26 or 28 of FIG. 3, depending on whether the forward or reverse rotation command signal is produced. Each of gates 130 and 132 feeds one side of a motor drive or energizing circuit 140, which is arranged such that driving one side of the circuit energizes the motor for rotation in a normal or forward direction and driving the other side of the circuit energizes the motor 10 for rotation in the reverse direction. Hence, the gates 130 and 132 each feed one side of the circuit 140. Which of the gates 130 and 132 will be enabled to pass the signal on line 114 to circuit 140 depends upon with whether the forward or normal rotation control signal is present on line 118 or the reverse rotation control signal is present on line 120. Accordingly, the effective reversal of the control signals by gating circuit 116 in response to a current surge detected by circuit 122 will cause the forward control signal (from output 108) to energize the reverse rotation portion of the circuit 140 and vice-versa. This then reverses the direction of rotation of motor 10 whenever the motor begins to stall while a command signal is still present, for example if the slats of the blind or other controlled member reaches a limit of movement thereof.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A remote control system for controlling bidirectional rotation of an electric motor comprising: a hand-held transmitter provided with a transmitting control circuit capable of developing a forward rotation command signal and a reverse rotation command signal and transmitting means responsive to each of said command signals for transmitting a predetermined, corresponding number of infrared pulses for a predetermined amount of time; and a receiver and drive unit operatively coupled with said electric motor and comprising receiving means responsive to said infrared pulses from said transmitting means for developing a corresponding received command signal, a discriminator circuit for determining whether said received command signal corresponds to the command signal for forward rotation or reverse rotation, and drive circuit means responsive to said discriminator circuit for energizing said electric motor for rotation in a corresponding direction; wherein said receiver and drive unit further includes a protection circuit coupled intermediate said discriminator circuit and said drive circuit and responsive to a current surge produced by stalling of said electric motor for causing the discrminator circuit to produce a control signal opposite to the received signal for reversing the direction of rotation of the motor.

2. A remote control system for rotating an electric motor, such as for use in opening and shutting a blind or the like, said system comprising: a hand-held transmitter provided with infrared ray transmitting means and a transmitting control circuit capable of developing a normal rotation command signal and a reverse rotation command signal, said infrared transmitting means being responsive to each of said command signals for emitting a predetermined, corresponding number of infrared pulses for a predetermined amount of time; and a receiver and drive unit operatively coupled with said motor, said receiver and drive unit comprising receiving means responsive to said infrared pulses from said infrared ray transmitting means for developing a corresponding received command signal, a discriminator circuit for determining whether said received command signal corresponds to the command signal for normal rotation or reverse rotation and producing a corresponding forward or reverse rotation control signal, and drive circuit means responsive to said control signal for causing rotation of said electric motor in a corresponding direction; wherein said receiver and drive drive unit further includes a protection circuit coupled intermediate said discriminator circuit and said drive circuit and responsive to a current surge produced by stalling of said electric motor for causing the discriminator circuit to produce a control signal opposite to the received command signal for reversing the direction of rotation of the motor.

3. A system according to claim 2 wherein said receiver and drive unit further includes amplifier circuit means coupled between said receiving means and said discriminator circuit for amplifying said received command signal.

4. A system according to claim 2 wherein said infrared transmitting means comprises at least one light emitting diode.

5. A system according to claim 2 wherein said receiving means comprises an infrared-responsive photodiode.

6. A system according to claim 2 wherein said hand-held transmitter further includes manual selector means for selecting one of said normal rotation command signal and said reverse rotation command signal.

* * * * *